(12) United States Patent
Liao

(10) Patent No.: US 8,671,930 B2
(45) Date of Patent: Mar. 18, 2014

(54) ONE-AXIS SOLAR TRACKER SYSTEM AND APPARATUS WITH WIND LOCK DEVICES

(75) Inventor: Henry H. Liao, Los Alamitos, CA (US)

(73) Assignee: The Liao's Family Limited Partnership, Los Alamitos, CA (US)

( * ) Notice: Subject to any disclaimer, the term of this patent is extended or adjusted under 35 U.S.C. 154(b) by 946 days.

(21) Appl. No.: 12/816,195

(22) Filed: Jun. 15, 2010

(65) Prior Publication Data

US 2011/0186040 A1 Aug. 4, 2011

Related U.S. Application Data

(60) Provisional application No. 61/337,266, filed on Feb. 2, 2010.

(51) Int. Cl.
*F24J 2/38* (2006.01)

(52) U.S. Cl.
USPC .......................... 126/576; 126/600; 126/605

(58) Field of Classification Search
USPC .......................... 126/571, 573, 576, 600, 605
See application file for complete search history.

(56) References Cited

U.S. PATENT DOCUMENTS

| | | | | |
|---|---|---|---|---|
| 4,440,149 A * | 4/1984 | Hattan | ............................ | 126/573 |
| 8,353,285 B2 * | 1/2013 | Litwin | ............................ | 126/573 |
| 8,459,249 B2 * | 6/2013 | Corio | ............................ | 126/600 |
| 2004/0261955 A1 | 12/2004 | Shingleton et al. | | |
| 2009/0188488 A1 | 7/2009 | Kraft et al. | | |
| 2010/0101560 A1 * | 4/2010 | Olsson et al. | .................. | 126/605 |
| 2010/0139645 A1 * | 6/2010 | Whipple et al. | ............... | 126/576 |
| 2010/0263659 A9 * | 10/2010 | Taylor et al. | ................... | 126/600 |

FOREIGN PATENT DOCUMENTS

| | | |
|---|---|---|
| CN | 2386391 Y | 7/2000 |
| CN | 201352019 Y | 11/2009 |
| JP | 2007-258357 A | 10/2007 |

* cited by examiner

*Primary Examiner* — Craig Schneider
*Assistant Examiner* — Craig J Price
(74) *Attorney, Agent, or Firm* — Henry H. Liao

(57) ABSTRACT

The present invention proposes a one-axis solar tracker system and apparatus which is simple to install, lower cost and with the provision of an electric-magnetic locking device to resist from medium to strongest wind condition like hurricane or typhoon. Solar farms is more and more popular to use one-axis tracker due to lower cost, higher wind resistance and easier for large scale solar farm installation, especially at lower latitude tropic zones. This disclosure proposes a one-axis tracker with multiple posts support using a single or dual linear actuators driving mechanism for rotation. It is also equipped with a wind lock device to lock the solar tracker in horizontal neutral position during strong wind condition such as hurricane or typhoon. The stepwise wind lock device can further be applied to locking the solar tracker following each step of linear actuator activation enabling the disclosed solar tracker to operate in windy conditions.

33 Claims, 13 Drawing Sheets

ONE-AXIS SOLAR TRACKER SYSTEM AND APPARATUS WITH WIND LOCK DEVICES

CROSS REFERENCE TO RELATED APPLICATION

This application is based on U.S. Provisional Application No. 61/337,266, filed Feb. 2, 2010.

BACKGROUND OF THE INVENTION

1. Field of the Invention

The present invention relates to a one-axis solar tracker system and apparatus which is simple to install, lower cost and the provision of an electric-magnetic locking device to resist from medium to strongest wind condition like hurricane or typhoon. In the global pursuit of using more green energy, solar farms is more and more popular to use one-axis tracker due to lower cost, higher wind resistance and easier for large scale solar farm installation, especially in lower latitude tropic zones. This disclosure proposes a low cost, low profile one-axis tracker with multiple posts support using a single or dual linear actuators driving mechanism for rotation. It is also equipped with a wind lock device to lock the solar tracker in horizontal neutral position during strong wind condition such as hurricane or typhoon. The stepwise wind lock device can further be applied to locking the solar tracker following each step of linear actuator activation enabling the disclosed solar tracker to operate in windy conditions.

2. Description of Prior Art

Reducing carbon dioxide and other pollutants production is the common cry by all the nations in order to curb the trend of global warming. In one area related to green energy revolution is the utilization of pollution free solar electric farm for future utility plants or any other large scale installation of solar panels. The solar panels installed on residential roof top becoming more and more popular scene in residential street. However, the fixed panel installation does not use the solar energy efficiently. There is a cosine angle multiplier of energy efficiency if the sun is slanted away from perpendicular exposure of solar panel. If the solar panel is flat in the horizon direction, the solar energy collected from sunrise to sunset accumulates only 64% of total exposed sun energy during day light. It is further multiplied by today's silicon solar cell efficiency of around 16%. The total daily efficiency results in only 10% of solar energy exposed on the solar panel. In other words, if we use fixed solar panel without sun tracking, it would lose about 36% of solar energy from sunrise to sunset. However, solar tracker on the market is not cheap today. If the solar tracker costs more than 36% of the solar panels it carried, one might as well go without solar tracker; since it does not worth the investment. Besides, moving parts on solar tracker naturally have the higher tendency of failure than fixed installation.

One-axis solar tracker installed on solar farm is not new. A typical solar-thermo parabolic trough reflector to collect solar heat uses one-axis tracker. However, the parabolic trough must be connected for a long length to heat up water to a high temperature steam for turbine engine generator. The one-axis solar tracker for solar panel is desired to be smaller in size for the following reasons: 1) The structure must be able to resist strong wind; the lower the structure, the better wind resistance it achieves, 2) The smaller tracker can be installed without big and heavy equipments, and it is easier to maintain and replace at human height level, 3) The installation of big structure is a major cost item. The design of solar tracker must be simple with minimum labor and machine cost involved in installation.

Another key issue of solar tracker is the problem of facing unusual strong wind like typhoon or hurricane. The solar-thermo parabolic trough can only be installed in limited locations on the earth where there is no hurricane or typhoon. Also, the parabolic trough needs excessive strong structure to hold up the reflector from wind force. On the contrary, solar photovoltaic system desires to be installed anywhere on earth with sunshine. Therefore, the structure must be able to hold up the strong wind during hurricane or typhoon seasons.

BRIEF SUMMARY OF THE INVENTION

With above discussion of one-axis solar tracker requirement, it is one aspect of the disclosure to propose an idea of using multiple low profile posts for one-axis solar tracker installation. The preferred embodiment is using multiple helical head post for speed installation. The helical posts will not only reduce the time required for installation with least machinery and labor cost, but also provide an ecological means for solar farm installation which does not use concrete material for environmental concerns.

In another aspect of the disclosure, it is proposed to use one or dual linear actuators to drive the entire solar tracker which simplified the driving mechanism and saving the cost of moving parts. It also makes the regular maintenance and replacement of moving parts simple at low profile. This will enable continuous functioning of solar farm with minimum down time for the solar farm.

In yet another aspect of the disclosure, it proposes a new approach of automatic locking device to lock the solar tracker in a wind neutral horizontal position to avoid damage to the precious solar panels by typhoon or hurricane. The simplest lock will be using manual T-rod insertion. The locking device can also use an electro-magnetic locking device commanded by a tracker controller. In addition, the disclosed wind lock device can further be used in a stepwise wind lock following step by step rotation of solar tracker for windy condition operation. Therefore, the disclosed solar tracker becomes a robust tracker adaptable to various seasonal windy conditions throughout the world.

Finally, this disclosure proposes a concept to alleviate the effect of tracker to tracker shading on power output. The concept use inter-panel row by row serial connections, instead of traditional same panel serial connections. This concept can smooth out the shading effect by phasing in power generation row by row in the solar panel instead of losing the entire panel due to shading.

This disclosure proposes an alternative approach for the one-axis solar tracking system and apparatus, which address many of the problems discussed above. In this disclosure, a one-axis tracking solar panel mounted on multiple helical piles is proposed. If the soil property prohibits the use helical post, the alternative is posting on concrete bases. The disclosed one-axis solar tracker installation can be slightly tilted toward the equator for higher latitude locations. In addition, the disclosed one-axis solar tracker is designed to use one or dual linear actuators to tilt the entire panels from sunrise to sunset to near 180 degree rotation. The most important feature of this disclosure is to use an automatic locking device designed to hold the tracker panel in horizontal position with locking to base posts during unusual strong wind condition. In addition, the wind lock devise can be used for stepwise wind lock in high wind operation. In this disclosure, the solar tracker actuator does not have to be over designed to stand up the extreme case of hurricane or typhoon, but to rely on the locking devices to fix the solar tracker at wind neutral horizontal position.

These and other features, aspects and advantages of the present disclosure will become understood with reference to the following description, appended claims and accompanying figures.

DETAILED DESCRIPTION OF THE INVENTION

Figure 1:
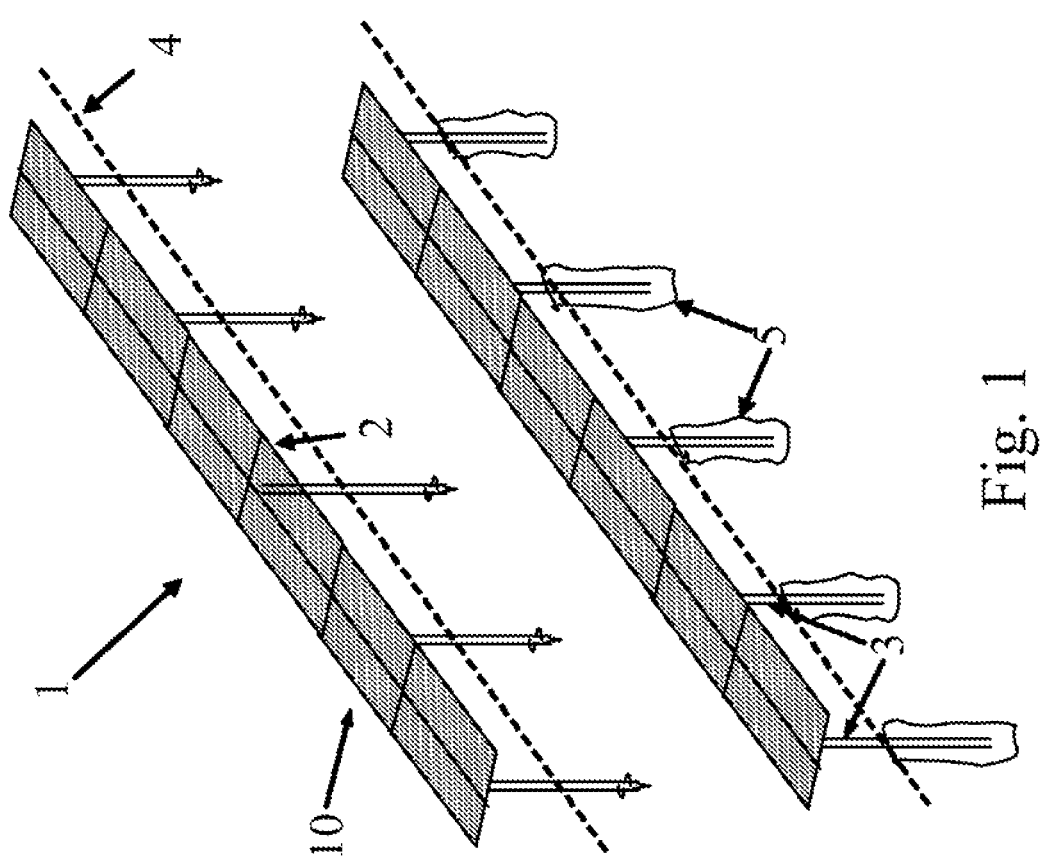
FIG. 1 is an example general view of the disclosed one-axis solar tracker

As shown in FIG. 1, one aspect of the disclosed one-axis solar tracker is designated as 1. The top of the tracker is mounted with solar panels 10 with mounting frame structure 2 and driving actuator underneath. The frame structure 2 is mounted on multiple helical pile post 3. The helical pile post 3 is inserted like a screw into the ground level 4. Normally the helical pile post 3 has longer section under ground than above ground for wind resistance and stability. The preferred embodiment is using helical pile post for speedy installation at lower cost. However, if the soil condition and location of installment preclude the use of helical pile post, the alternative is using higher cost concrete base 5 under the ground level to secure the post 3.

Figure 2:
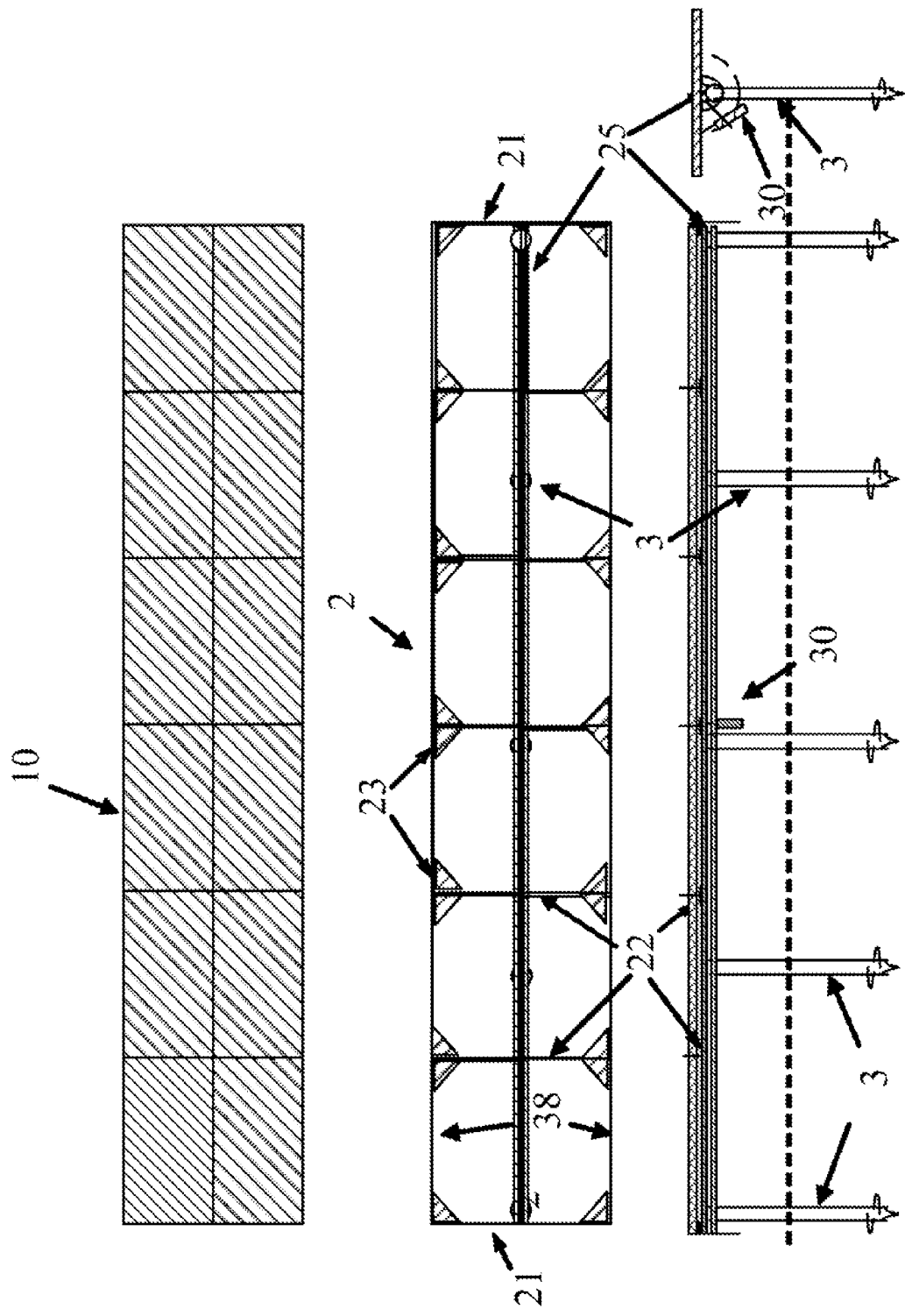
FIG. 2 is a schematic top, side and end views of disclosed one-axis tracker.

Three dimensional section views of the disclosed tracker 1 are depicted in FIG. 2. The top view of the solar panels is shown as 10 which consist of twelve panels. A preferred embodiment is mounting twelve panels on one tracker. Six panels on each row are matching six rows of cells in each panel for shading avoidance to be discussed in FIG. 12. The mounting frame structure 2 for the solar panels 10 consists of two L-beams 21 at both end of rotating axis tubing 25. In the middle, the mounting frames 2 for solar panels are T-beams 22. On two long sides of the frame structure 2, two parallel elongated L-beams 38 are attached on the ends of L-beams 21 and T-beams 22 to make a long rectangle tracker frame 2. To maintain rectangular structure of tracker frame and to protect rectangular solar panel frames, four corner triangle plates 23 are attached between neighboring L-beams 38, L-beam 21 and T-beam 22. Alternatively, the L-beam 38 can be installed in sections attached between T-beams 22 and L-beams 21 for simplicity. The four corner triangle plates 23 may be unnecessary. The depth of L-beams 21 and T-beams 22 are matching to typical solar panel frame thickness (50 mm) with room for securing solar panel from the top. The entire rigid solar panel frame 2 is mounted on an elongated cylindrical center tubing 25 secured with rotating bushing 24 and pillow block clamps 35 under T-beams 22 and L-beams. The center tubing 25 is fixed and secured to the posts 3 and serves as the rotating axis for the tracker. The center tubing 25 can be one long piece of tubing, or multiple pieces of tubing connected by couplers. The center tubing 25 is then attached and supported underneath by ground posts 3. The ground posts can be drilled to the ground with drilling machine; or cemented to the ground alternatively as depicted in FIG. 1.

The side view and end view of the disclosed one-axis tracker 1 is shown at the bottom of FIG. 2. It is noticed that the ground posts supporting point is not exactly under the L-beams 21 or T-beams 22, but rather separated by a small gap for the purpose of linear actuator and "wind lock" installation to be described in FIG. 5 and FIGS. 8, 9, 10 respectively. At around the middle of rotating axis tubing under a T-beam, a linear actuator 30 is attached to the ground post 3 at one side and center tubing at other side with detail to be described in FIG. 4 and FIG. 5. The rotating mechanism will be described in FIGS. 7A and 7B.

Figure 3:
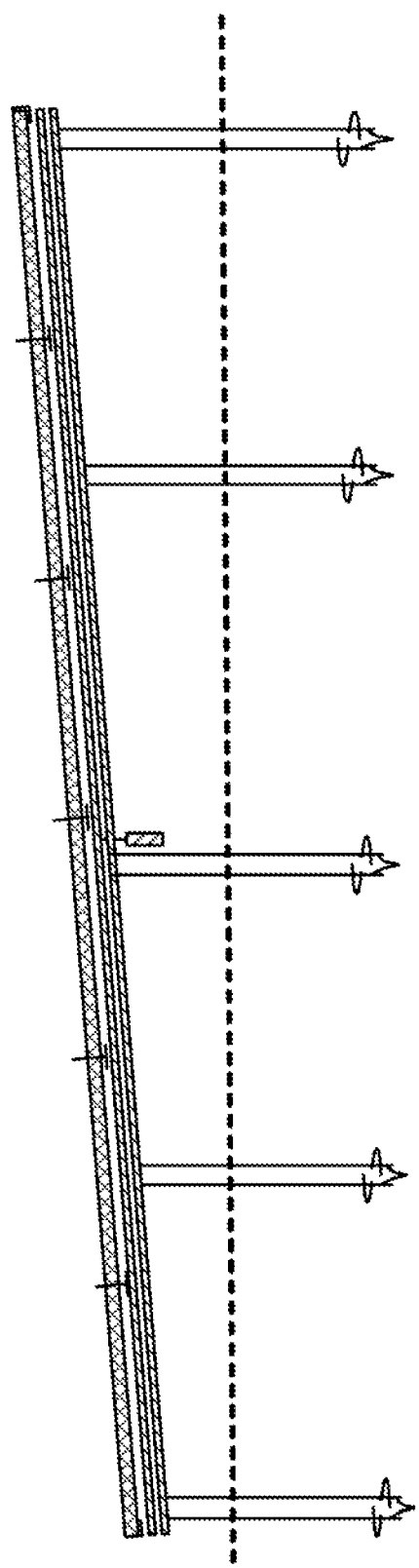
FIG. 3 is a schematic side view of one-axis tracker tilted toward equator.

FIG. 3 discloses a potential tilted one-axis tracker suitable for higher latitude installation. The one-axis tracker is tilted toward the equator with tilting angle depending on the latitude; which is normally biased toward summer suns due to higher demand of electricity. The helical pile post has the advantage of tilted tracker installation with simple adjustment of post height above ground.

Figure 4:
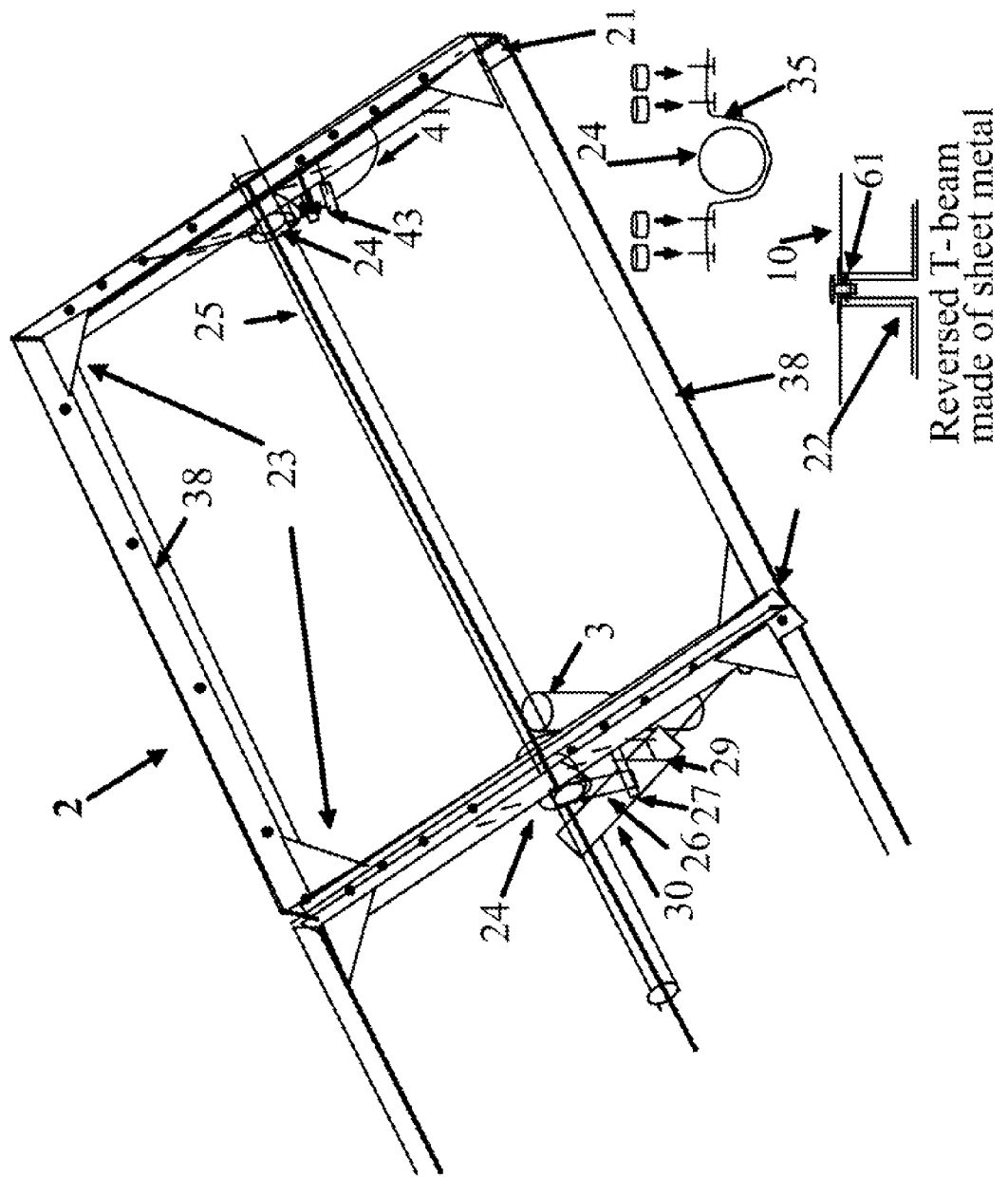
FIG. 4 is a detailed sectional frame structure and attachments of the tracker.

FIG. 4 is a detailed sectional schematic of the disclosed tracker frame structure 2 and attachment of linear actuator. As illustrated, the L-beam 21 and T-beam 22 are separated with spacing matching the side dimension of solar panel. The preferred embodiment is to mount the solar panel in the long dimension aligned with rotating axis for the purpose of "progressive shading" effect to be discussed in FIG. 12. Also, for simplicity of manufacturing and packaging, two end L-beams 21 can be replaced by T-beams 22 with uniform mounting hardware. Four triangle corner plates 23 are mounted on all joints between L-beam 21, T-beam 22 with L-beams 28 for structure shear force reinforcement. The L-beams 21 and T-beams 22 are then mounted atop the central rotating axis tubing 25 via rotating bushings 24. A preferred embodiment is using rotating bushing 24 secured by a pillow block clamp 35 between the rotating axis tubing 25 and T-beam 22 or L-beam 21 as depicted at the right lower corner of FIG. 4; where a cylindrical rotating bushing 24 is made of brass, bronze or alloy suitable oil-less rotation. Furthermore, the inner surface of pillow block clamp 35 can be roughed up with many mini bumps. This will prevent slipping of rotating bushing 24 from pillow block clamp 35. The rotating bushing 24 can be replaced by a higher priced roller bearing (specifically a needle bearing). But it is not necessary due to very slow rotation of the tracker, and the bearing may not meet the long term oil-free and maintenance free durability requirement. The linear actuator 30 is the driver of entire tracker panel. The preferred embodiment is to use a single linear actuator for the entire tracker. However, multiple actuators working in unison is also proposed in this disclosure. The "jack head" of the linear actuator 30 is attached underneath the center T-beam at one side with a rotating hinge. The top section body of the linear actuator 30 is clamped by two rotating arms 29, which is hinged on a horizontal rod 27 inserted in and locked on the post 3 on one side; and attached to a fix arm 26 on the other side. The fixed arm 26 is clamped under center tubing 25 vertically.

Figure 5:
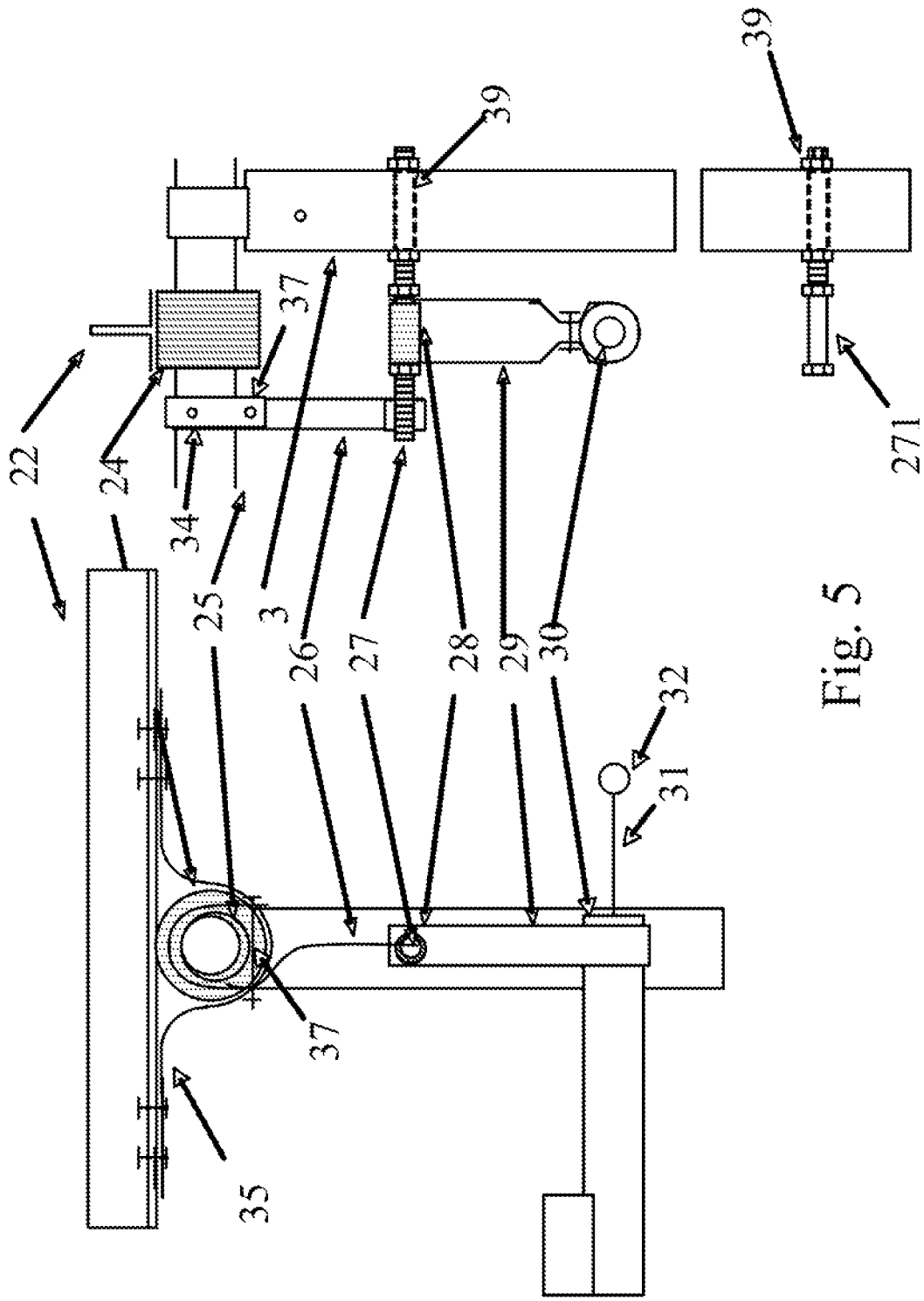
FIG. 5 is schematic end and side views of actuator attachment on ground post.

FIG. 5 is detail schematics of linear actuator attachment to the center tubing. Both the end view (left) and the side view (right) of the attachment are shown. As depicted in FIG. 5, the T-beam is attached atop the center tubing 25 using a rotating bushing 24 and a pillow block clamp 35. On one side of pillow block clamp 35, a ground post 3 is used to secure a cylindrical horizontal rod 27 near the top end of post. The horizontal rod 27 is inserted into the post 3 horizontally and secured with two nuts 39 at both sides. The other end of rod 27 is held by a fix arm 26 with top end clamped on the center tubing 25 at opposite side of rotating bushing 24 relative to post 3. Arm 26 is clamped on tubing 25 vertically with bolts and nuts 37 and lock screw 34. Various means of attachment to rod 27 by arm 26 is possible. For example, the vertical flat fixed arm 26 can be twisted 90 degrees with a bottom hole to insert rod 27 horizontally. For simplified and lower cost implementation, the vertical arm 26 may be deleted if the horizontal rod 27 is made of long bolt 271 as depicted at right lower corner of FIG. 5, where only a long bolt 271 is secured on post 3 with two nuts 39 at both sides. The horizontal rod 27 provides the rotating axis of linear actuator 30. Two parallel rotating arms 29 are hinged on the horizontal rod 27 with an optional spacer tubing 28 attached in between parallel arms 29. The bottom ends of rotating arms 29 are shaped like pipe clamp to hold on the linear actuator 30. Preferred embodiment is holding on the top body of linear actuator at right angle as depicted in FIG. 5. The jack head 31 and top hinge 32 is not attached to the center T-beam 22 yet as shown in FIG. 5. The attachment will be shown in FIGS. 7A and 7B. It is noted that parallel rotating arms 29 hinged with optional cylindrical tube 28 on horizontal rod 27 are designed to minimize the lateral swing of the linear actuator. The purpose is to hold the actuator motion only in axial direction to minimized one axis pointing error.

Figure 6:
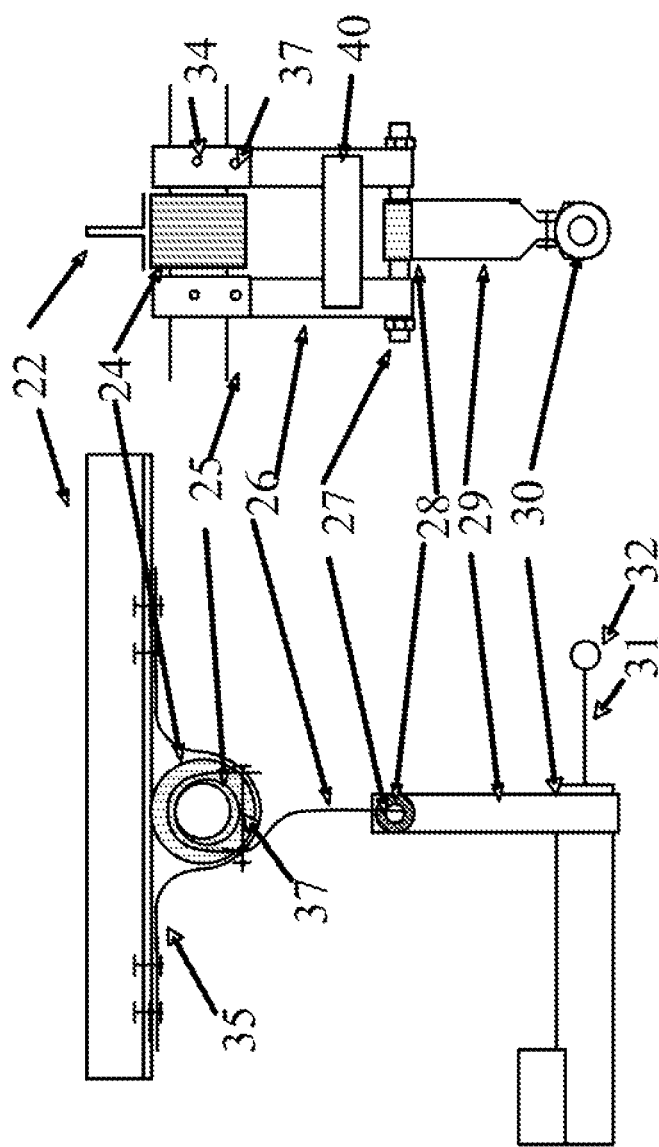
FIG. 6 is schematic end and side views of actuator attachment on center tubing.

FIG. 6 illustrates an alternative embodiment of holding the linear actuator 30 on center tubing 25 only; whenever a ground post is not nearby. Two parallel vertical fix arms 26 are clamped on the center tubing 25 with bolts and nuts 37 and locking screws 34. Two vertical arms are also connected with a center bar 40 for rigidity. The bottom end of the fix arms 26 are attached with horizontal rod 27. Various means of attachment to horizontal rod 27 is possible. Preferred embodiment is to twist flat fixed arms 26 ninety degrees with a bottom holes to insert horizontal rod 27 secured at both ends. The horizontal rod 27 provides the rotating axis of linear actuator 30 similar to the horizontal rod 27 in FIG. 5. The rest of linear actuator attachment is identical to FIG. 5.

Figure 7A:
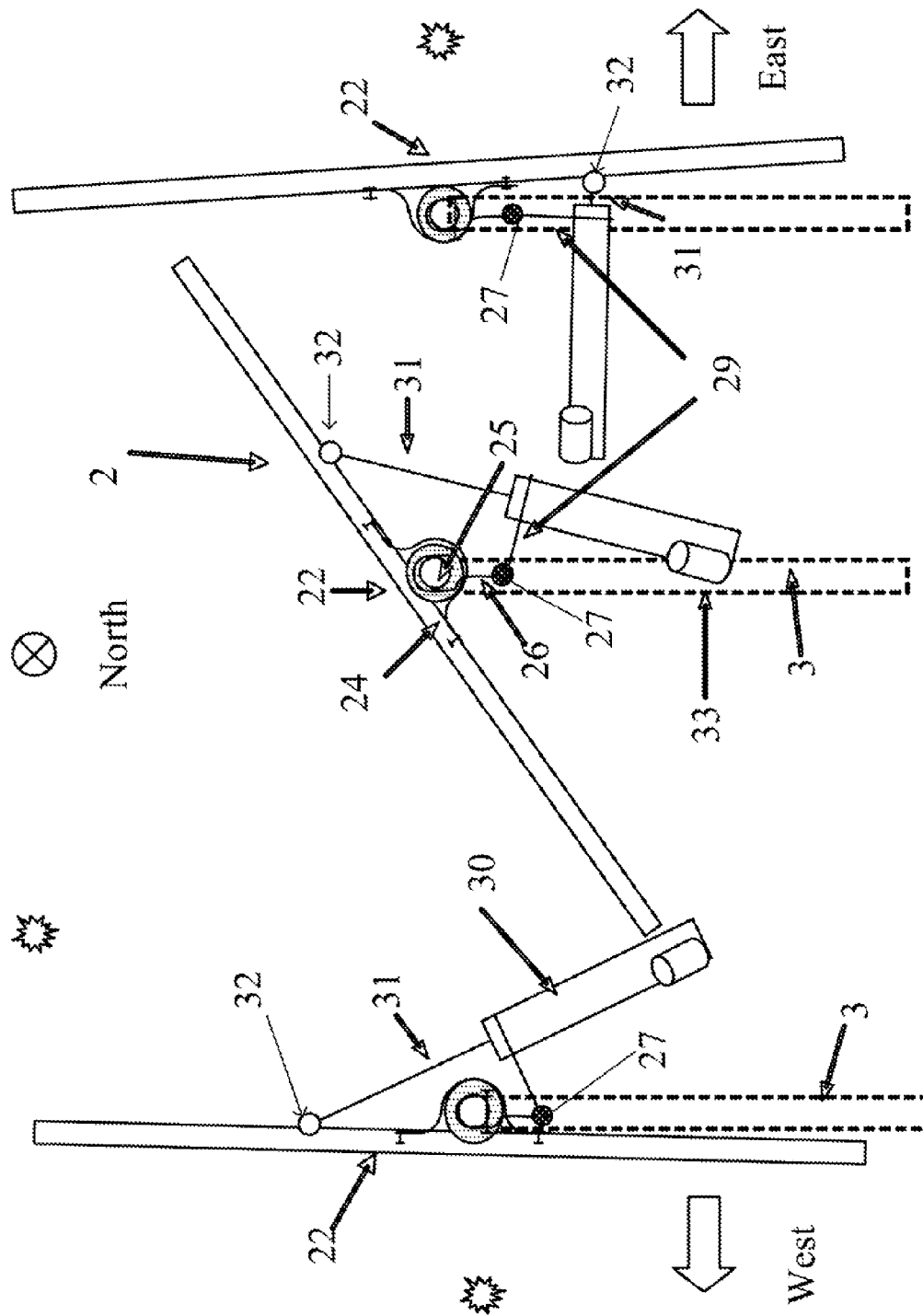
FIG. 7A is three schematic end views of one-axis tracker rotation mechanism.

FIG. 7A illustrates three cross sectional views of rotating mechanism at different rotating positions of the one-axis tracker (viewed from the cross section of center T-beam which attached the jack head of linear actuator). The rotating axis horizontal rod 27 for liner actuator is secured between the post 3 and bottom end of fixed arm 26 horizontally (or alternatively held on by two fix arms 26). Two rotating arms 29 are hinged on the rotating axis horizontal rod 27. The linear actuator 30 is clamped on at the bottom end of rotating arms 29 at right angle. At the initial position of linear actuator 30 illustrated at right hand side of FIG. 7A, the T-beam 22 and solar panel 10 is tilted a small elevation angle (say 5 degree versus a vertical line) facing sunrise. The small angle is to prevent the solar panel hitting the ground post at sunrise. The jack head 31 of actuator 30 is at shortest position and form a right angle with arm 29 which forms two legs of a right triangle. The hypotenuse of the right triangle will be the line between hinges 32 and rod 27. As the jack head 31 extends from the initial position, the T-beam 22 shall be pushed counter-clockwise around center tubing 25. (The actuator 30 will not be pushed back since in geometry theory with one leg 29 of right triangle fixed and the other leg 31 extends, the "hypotenuse" line between hinges 32 and rod 27 must increase in length. Therefore, T-beam 22 must rotate counter clockwise to increase the hypotenuse which resulted in the entire panel rotating counter clockwise). Therefore, the solar panel is rotated following the sun orbit as depicted in FIG. 7A. The middle of FIG. 7A represents the panel rotation facing the sun around 3 PM in the afternoon. At final extension of the jack head 31, the T-beam 22 will be rotated toward sunset at the left hand side of FIG. 7A. The linear actuator driving motor 33 is normally attached at the bottom of linear actuator.

It is noted that the jack head of linear actuator can be attached reversely on the other side of T-beam with extended position at sunrise and shortest position at sunset. As a result, the sequence of jack head extension would be reversed. It is also noted in FIG. 7A, the linear actuator is nearly perpendicular to the solar panel at sunrise. The jack head force vector (sine of angle of jack head to T-beam) against wind load is the best at this position. At sunset, the jack head force becomes the weakest since the linear actuator is slanted at small angle to the T-beam to produce a small force vector. This is the problem with one linear actuator with uneven force vector to the T-beam at different time of the day.

Figure 7B:
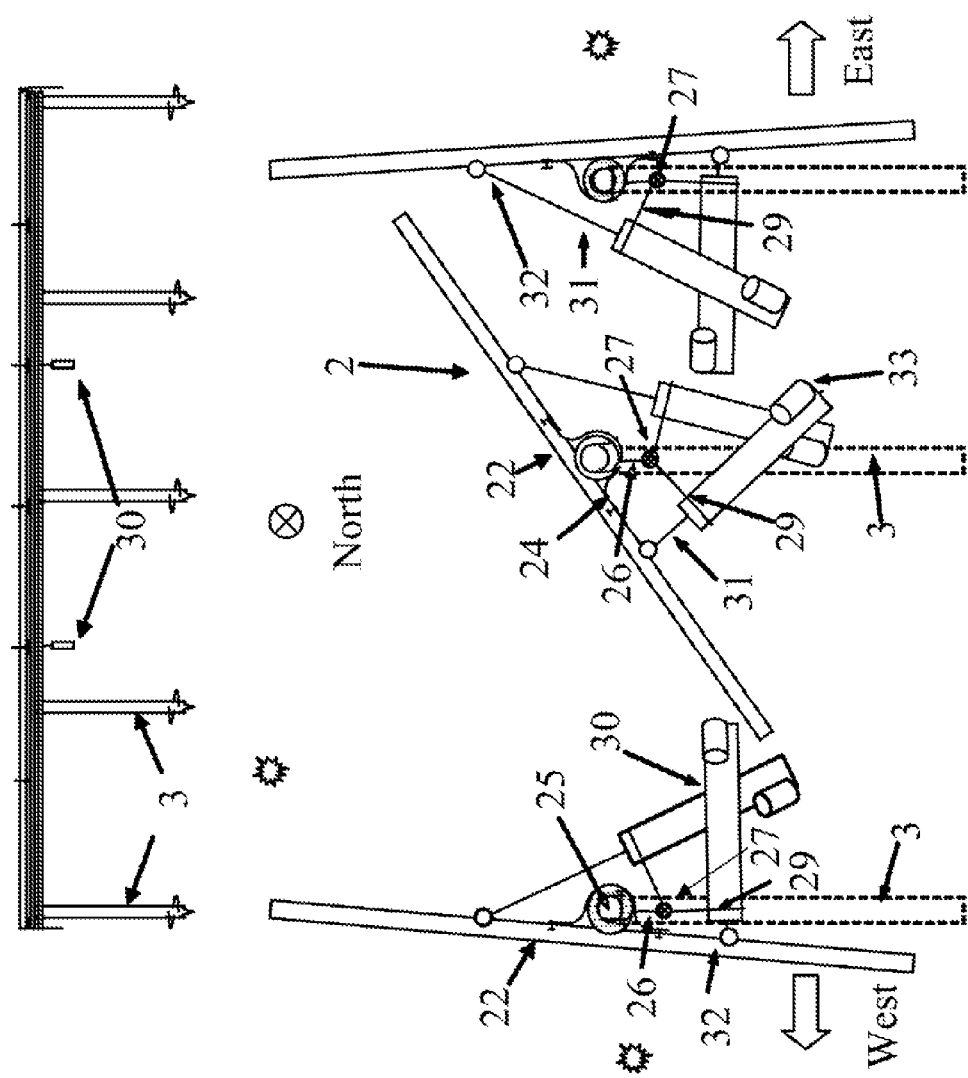
FIG. 7B is schematics of dual push-pull actuators tracker rotation mechanism.

To correct the above problem, the idea is using two parallel "push-pull" linear actuators pair attached reversely on two T-beams 22 at opposite sides to compensate each other as illustrated in FIG. 7B. The linear actuator of FIG. 7A is performing the push function at its shortest position and highest force vector at sunrise (as shown in the background actuator of FIG. 7B). The new linear actuator in the foreground performs the pull function with the shortest position and highest force vector at sunset. Therefore, with dual "push-pull" parallel linear actuators working in unison, the force vector of linear actuators compensate each other and holding the wind load evenly throughout the day. Especially at sunrise and sunset, the side blowing wind can be handled by one of the linear actuators at near perpendicular force vector. The dual push-pull linear actuators jack heads can be hinged on two T-beams 22 at opposite sides as depicted at top part of FIG. 7B. Since there is no post nearby, it has to be mounted on rod 27 secured with vertical arms 26. The selection of using a single actuator or dual actuators will depend on the actuator force specification, the local wind conditions and the addition of stepwise wind-lock device to be discussed in later sections.

It is also noticed in FIGS. 7A and 7B that the rotating axis of the solar panel frame is around center tubing 25, while the rotating axis of linear actuator is around rod 27. The solar panel frame rotates in a bigger circle with radius from hinge 32 to center of tubing 25, while the linear actuator rotates around rod 27 following the motion of hinge 32 in a smaller circle with radius of arm 29. Thus, driving a bigger circle panel rotation by a smaller rotation of linear actuator 30 requires smaller extension of linear actuator jack head. This design enables the rotation of one axis tracker to near 170 degrees with a single linear actuator.

However, the rotation of tracker 1 is not linearly proportional to the jack head 31 extension; since the jack head is in linear motion while the tracker is a circular rotation. The tracker controller will determine the jack head extension needed in linear actuator 30 to track the sun. For example, a typical linear actuator jack head extends at 1.27 pulses per mm, or 0.787 mm per pulse. If we extend the linear actuator about 16 inches 406 mm for 170 degrees rotation of the frame, then each stepping pulse would rotate 0.33 degrees in average. For a day with 180 degree rotation in 12 hours, the linear actuator is activated every 1.32 minutes in average, which is a fairly slow motion hardly noticeable by human eyes.

For any solar tracker design, the most challenging windy condition is during hurricane or typhoon period. The hurricane wind can be many times stronger than a windy day. During the hurricane period, the best we could do is to flatten the solar panel horizontally to neutralize the side blowing wind. The structure of solar panel needs to handle the strongest wind in flattened position only; but not other positions which facing the panel to heading hurricane wind. In subject one-axis tracker, the single linear actuator is designed for rotating the entire panel and withholding the wind force at normal windy conditions, but not rotating under hurricane. In other words, it is not necessary to be over-designed with panel facing the head wind in hurricane or typhoon conditions. Therefore, the disclosed one-axis tracker further presents a "wind lock" concept to supplement the linear actuator holding force under strong wind when the tracker panel is rotated to the flattened position. The wind locks are installed on both end posts (and more if necessary) to absorb the vibration and pounding of solar panel under strong wind to alleviate the wind load on the linear actuator.

Figure 8:
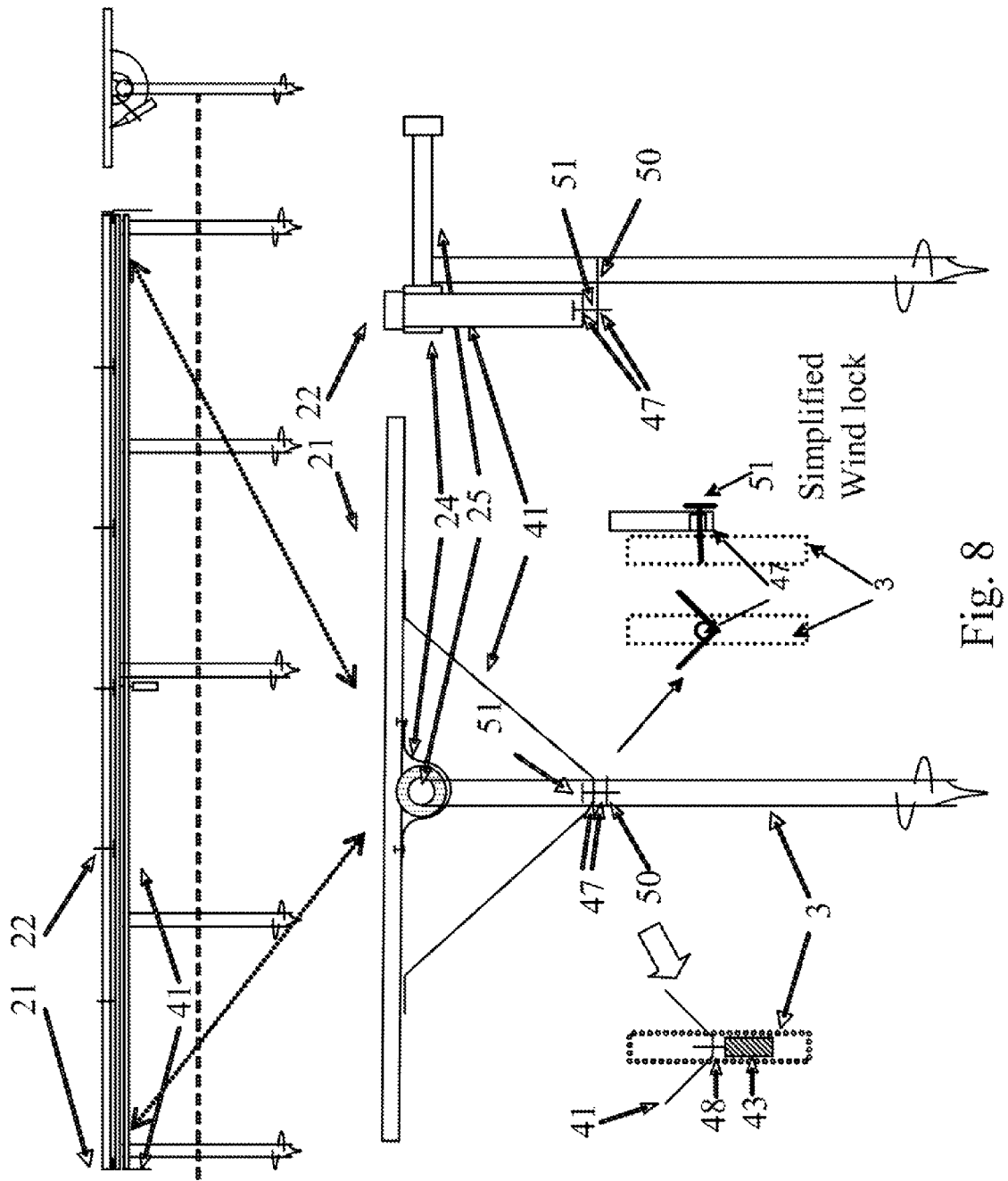
FIG. 8 is schematics of a manual and automatic triangular beam wind lock device.

In FIG. 8, simple structure reinforcement under strong wind condition is to use a triangle shaped metal beam 41. The metal beam can be a flat beam, or preferably an L-beam. The metal beam 41 is attached under the top L-beams 21 or T-beams 22 adjacent to a tracker post 3 primarily on both ends of the tracker. As mentioned earlier, the ground posts 3 are intentionally put in a designed distance to the T-beams 22 or L-beams 21 for the purpose of wind lock implementation. The triangular shaped beam is the simplest embodiment; other beam such as half circle beam has its advantage. At the center wedge of the triangle beam is drilled with a locking hole 47. Another corresponding piece of flat metal plate 50 is fixed to the post 3 right under the wedge of beam 41 when the tracker is in the flattened position. The fixed piece also has a corresponding locking hole 47. When the tracker is at flattened position, a nail-shaped T-rod 51 can be inserted manually through the aligned holes and lock the tracker frame firmly on the ground post. This is equivalent to tie down the solar panel and frame onto the ground to resist the side blowing wind force. The wind lock would then absorb the pounding and vibration force of the solar tracker and panels. Another simplified embodiment is to drill a wind lock hole on the ground post 3 and weld a corresponding tube 47 at the center wedge of triangle beam as illustrated in the middle sub-figure of FIG. 8. The wind lock T-rod 51 will then inserted horizontally in the post hole through the tube 47 for wind lock.

A simple improvement of manual locking T-rod 51 is using an automatic electro-magnetic locking device 43 shown in the lower left corner of FIG. 8. The device is similar to an automobile door lock. At the center of locking device is a tapered rod 48. Whenever the solar tracker is commanded to the flattened position, the electro-magnetic actuator 43 is then commanded to push the rod 48 upward to lock up the tracker. This will relieve the manpower required in a solar farm when thousands of trackers needed to be locked up during the strong wind period. Furthermore, the center rod 48 can be designed to be magnetized with electro-magnetic activation. The center of rod 48 can be attracted to steel triangular flat section by magnetic force and lock up the tracker. This method could avoid the misalignment of locking hole during strong wind, but may need more electricity for magnetizing the center rod.

Figure 9:
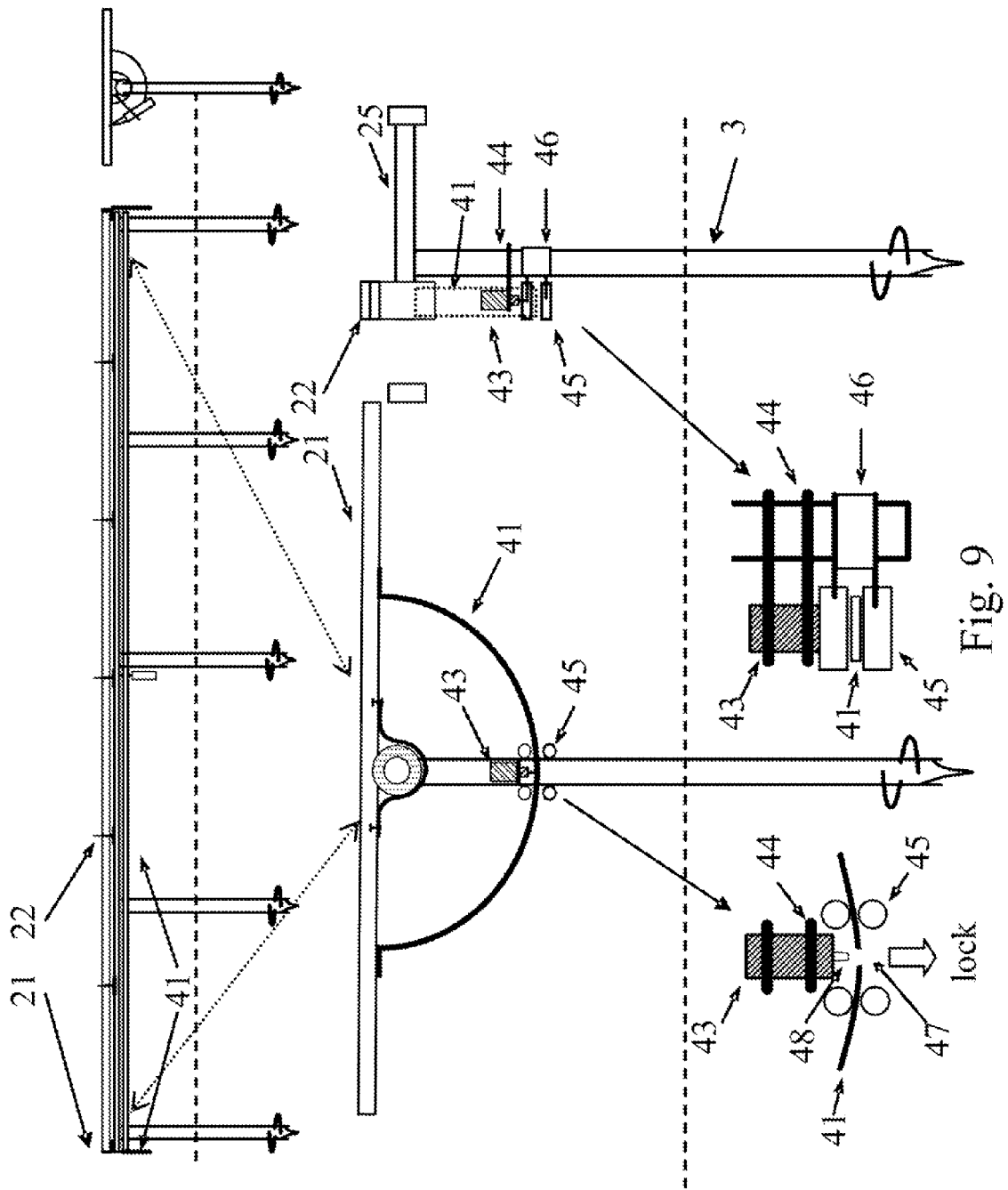
FIG. 9 is schematics of a half circle beam automatic wind lock device.

In FIG. 9, an improvement of the wind lock device is using a half circle beam 41. The half circle beam has the advantage of rotating through guiding rollers 45 with multiple holes drilled on the beam for various locking positions. The guiding rollers are fixed to adjacent ground post 3 via pipe clamp 44. As the solar panel commanded to the flattened position, the middle of half circle beam with the locking hole 47 is better aligned with the ground post 3 with guiding rollers. On top (or bottom) of the locking hole 47 and between the pairs of guiding rollers 45, an electro-magnetic locking device 43 is attached to the post 3 via pipe clamp 44. After the tracker controller commands to flatten the solar tracker, the locking hole 47 will be aligned directly under the locking device 43. The actuation of the lock device 43 will push the locking rod 48 into the locking hole 47. And the tracker frame is locked firmly onto ground posts. The locking rod 48 is an electro-magnetic actuated rod with tapered head for easier insertion into locking hole 47 with some tolerance. Locking hole 47 is larger than tapered head matching the mid-section of rod 48. The tapered rod head can catch the larger lock hole with some miss-alignment tolerance due to tracker vibration.

Figure 10:
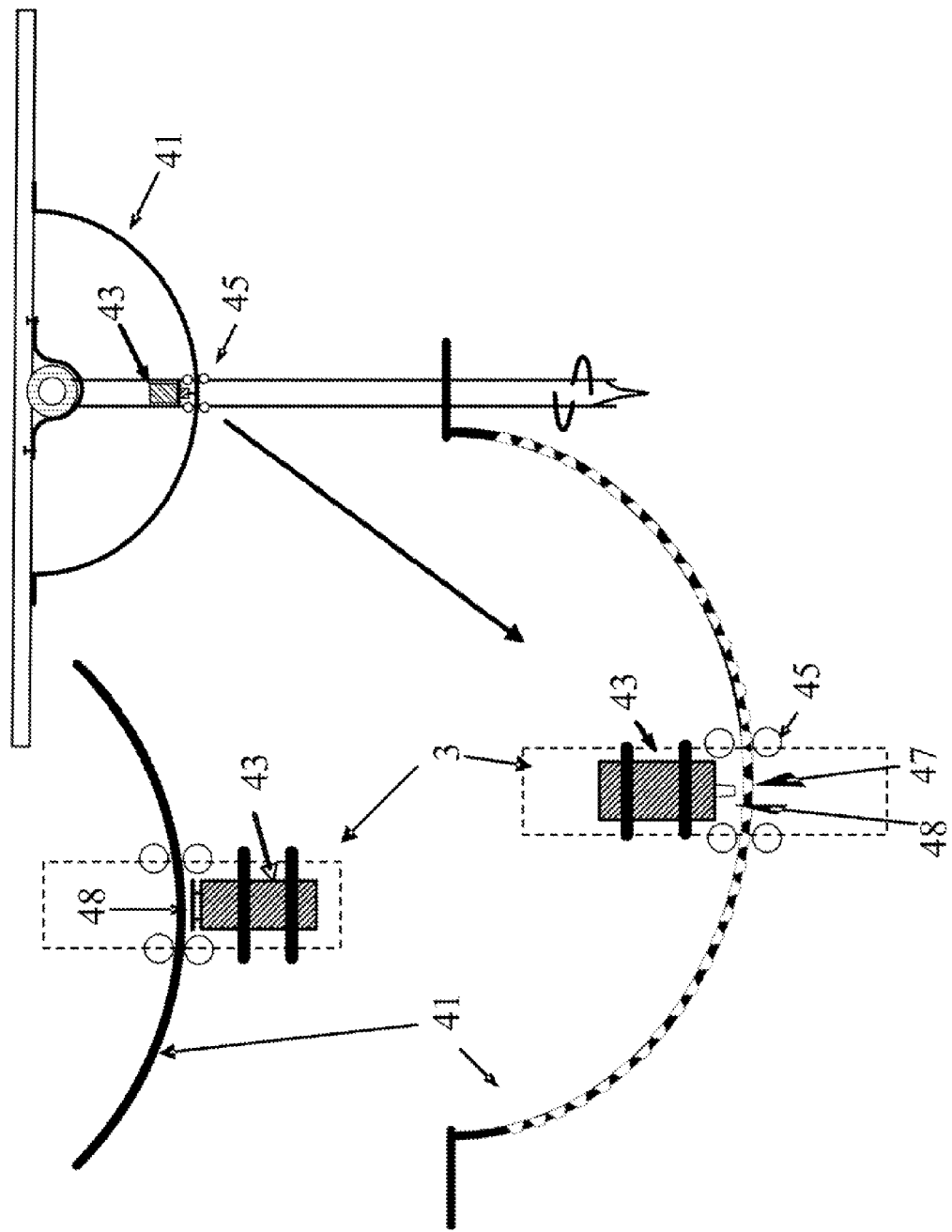
FIG. 10 is schematics of equal spacing stepwise and magnetic wind lock devices.

Beside the center locking hole, several other locking holes can be drilled on the half circle beam to hold the solar panel at any desired tilting angle. For example, a 5 degree to vertical angle is desired for solar panels washing. Another tilting angle can be locked for actuator replacement, etc. In a constant windy area such as at costal regions, the solar tracker could be under constant pounding of ocean wind. The linear actuator may not last long under constant tracker vibration due to continuous wind abuse. At both ends of solar panel, it can be vibrated and bended even more than the center section by strong wind; which may result in disastrous resonance vibration of the frame structure. One solution is to wind lock the tracker in every step of rotation. This will only require multiple equal spacing lock holes on the half circle. For example, if each hole is separated by 2° of rotation with 5° exclusion angle for sunrise and sunset, there will be 85 holes drilled in 170°. The idea is for the linear actuator to drive 2° rotation each time and locks; then the tracker frame is wind locked between activations. The duty cycle of activation for the wind lock is manageable since it is fairly long idle time between two activations. For 12 hours day lights when earth rotates 180°, it is exactly 8 minutes period between two activations. 85 activations per day is a low duty cycle for the wind lock and linear actuator hardware. Nevertheless, two degrees of maximum rotation error still achieves 99.94% of solar collection efficiency. FIG. 10 depicted the concept of equal spacing wind lock holes for each step of tracker rotation. To tolerate misalignment between locking rod 48 and locking hole 47 due to tracker vibration, a smaller tapered rod head is also designed to squeeze the rod body into larger lock hole. Each hole is spaced equally on the half circle at desired stepping resolution (angle).

Yet another alternative to tapered wind lock rod is to use larger electro-magnetic rod head depicted at upper sub-figure of FIG. 10. The locking rod 48 is made of steel material with a larger flat faced head. When the wind lock is activated, the locking rod is magnetized and attracted to the steel metal half circle beam 41 and locks by magnetic force. When it is de-activated, the locking rod is demagnetized and returns to the original unlock position. Preferred embodiment is fixing the electro-magnetic device under the half circle beam; such that the center rod will return to unlock position by gravity force. The second preferred embodiment is to secure the magnetic lock horizontally with cylindrical magnetic rod rolling and contact on the half circle beam. When activated, the rod will be attracted to half circle beam to lock up the tracker; and when deactivated, the cylindrical rod will roll with the half circle beam. The advantage of magnetic wind lock is the increase in rotational resolution. The locking activation can follow each step of linear actuator activation, which is less than one degree (0.32°) of rotation discussed in the example previously. The disadvantage of electro-magnetic wind lock is the use of more electricity for the electro-magnetic rod activation.

The disclosed solar tracker with one linear actuator works well under low wind or no wind condition. But when the linear actuator is extended with the jack head slanted to the solar panel, windy condition may cause problem to the holding force vector of actuator with a small slant angle to the panel. Stepwise magnetic wind lock described in FIG. 10 may be a good solution to supplement the holding force vector of linear actuator under windy condition.

Figure 11:
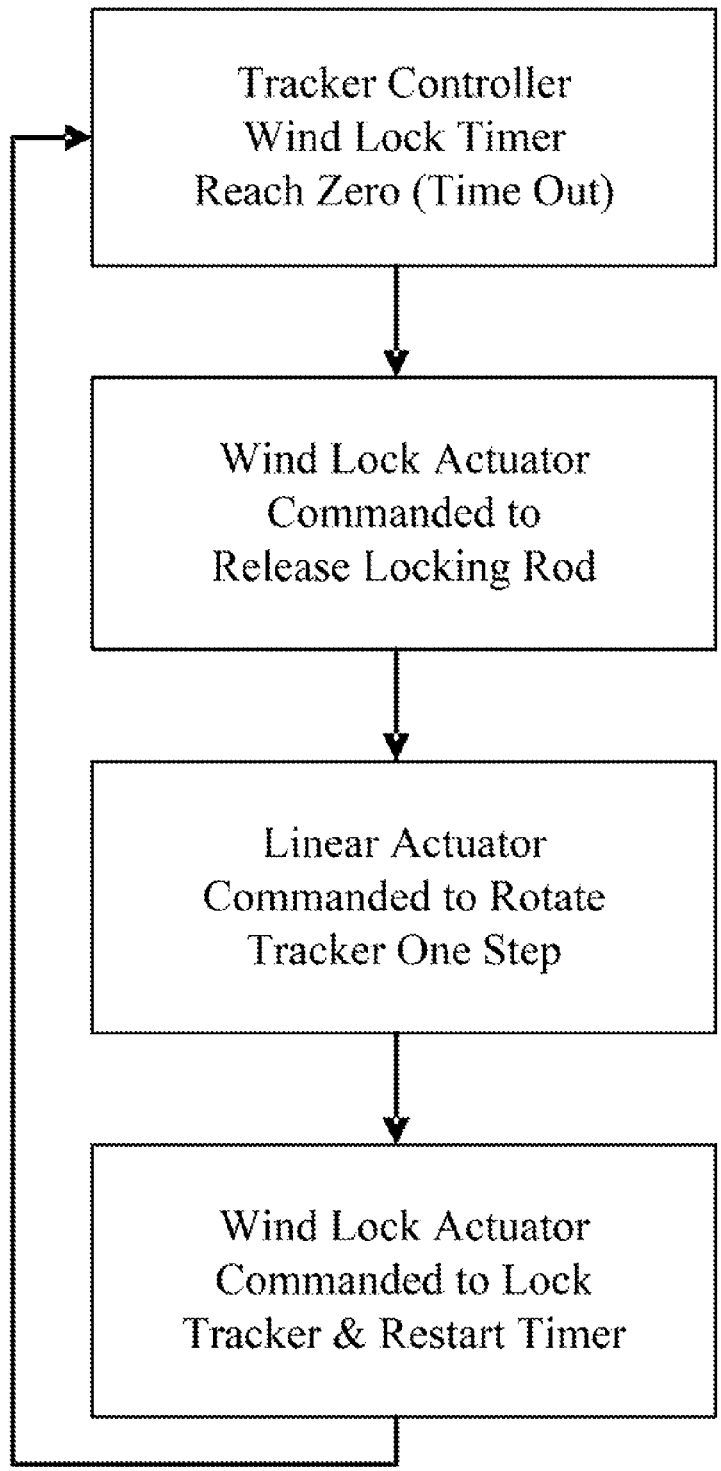
FIG. 11 is the process of stepwise wind lock operation following tracker rotation.

FIG. 11 describes the operating procedure of stepwise wind lock activation as follows: 1) The locking period count down timer times out (reaches zero) at the tracker controller, 2) The locking rod 48 is commanded by the controller to release to unlock position, 3) The linear actuator 30 is commanded by controller to rotate tracker one step, 4) The wind lock rod is activated to lock the tracker in position and the tracker controller restart the locking period timer. With wind lock provision in every step of tracker rotation, the disclosed one-axis tracker becomes more robust to counter any unpredictable windy conditions throughout four seasons.

Since drilling equal space tapered holes is also a simple process in manufacturing, it is advantageous to equip the half circle beam with standard equal spacing holes. On the other hand, if magnetic locking rod 48 is used, no locking hole is needed to be drilled. Therefore, the tracker can be universally adaptable to any installation location. We can categorized three stages of wind conditions for the tracker controller; 1) No wind to low wind stage when the wind lock is not used, 2) Medium to high wind stages when the wind lock is activated at each step of tracker rotation, 3) Strong wind stage when the solar tracker is commanded to be flattened with wind lock holding the tracker at horizontal position. This is the ideal embodiment of the disclosed one-axis tracker to be universally adaptable to any location. At little wind or no wind, it can save the power needed for wind lock activation. When wind condition above a threshold is detected, the tracker can still function by stepwise wind locking. With the wind speed exceeds strong wind threshold; the tracker is then commanded to the neutral flattened position to avoid any damage to the tracker and solar panels.

The wind lock device will not only supplement the tracker structure in normal operation, but also enable the use of a single linear actuator under regular wind conditions. Besides, the wind lock could alleviate other parts of tracker structure design requirement under medium to high wind conditions. With the concept of wind lock activation at each step of tracker rotation, the disclosed one-axis solar tracker will become highly robust for installation in any windy locations such as in the coastal zones.

One major problem of tracking solar panel is the shading on solar cells by neighboring tracker during sunrise and sunset. All the solar panels today connect solar cells in series for the entire panel to supply near constant higher DC voltage for easier conversion to 120V AC voltages. If some solar cells are shaded by neighboring panel (mostly row by row in horizontally north-south direction), the entire panel would become useless due to insufficient DC voltage supply to the inverter.

Figure 12:
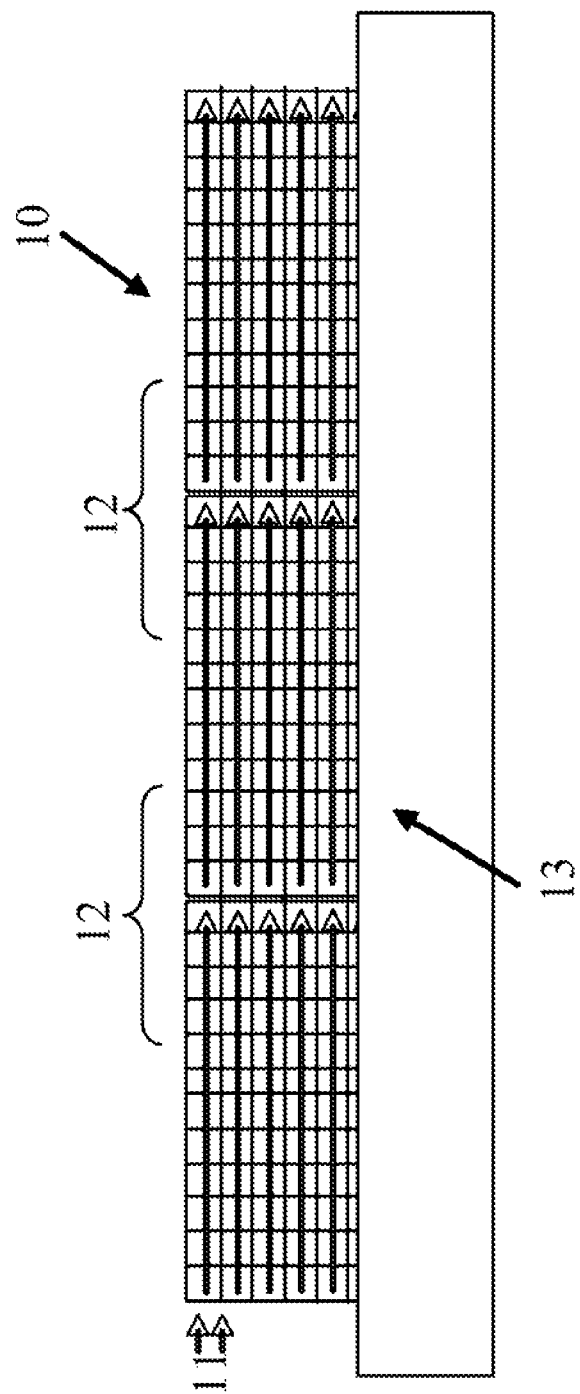
FIG. 12 illustrates the inter-panel serial cells connections avoiding total panel shading loss

In FIG. 12, an innovative inter-panel connection of solar panels is proposed. Each long dimension row 11 of solar panel is connected in series with connectors provided at both ends. Normally PV solar panels come with 6 rows in long dimension. For inter-panel series connection, there will be a connector with 7 pins (6 rows plus one common ground) connectors, and with female or male connecter at each end of solar panel. When solar panels are mounted on subject one axis tracker, each row is connected to corresponding row in next panel as indicated by 12. With 6 panels connected in series for each row, the output voltage is equivalent to the original panel output. Now, if the shading 13 from other tracker covers partially on the panel, only the covered row (s) is lost to shading. Uncovered rows will be still functioning to provide same voltage to generate electricity. Otherwise, the power of entire panel will be lost if any row of conventional panel is shaded. This will increase the power output of the solar trackers.

In summary, the main idea of this disclosure is to design a low profile one-axis solar tracker for low cost and speedy installation. The second aspect of the disclosure is to use single or dual linear actuators for the rotation of solar panel from sunrise to sunset at low elevation angle. The side attached linear actuator can be easier for regular maintenance and replacement at low cost in the course long term usage. This is one way to improve the reliability of tracker life with simple moving part replacement. The third aspect of the solar tracker is the attachment of "wind locks" to strengthen the structure during typhoon or hurricane period. The wind lock can alleviate the requirement of the entire structure to stand up to strong wind, and therefore, reduce the cost of the tracker. Furthermore, equal spacing or magnetic wind lock implementation enables step by step wind lock for high wind application. This aspect of implementation makes the disclosed one-axis tracker robust to be installed in any windy zones to stand up seasonal wind. The fourth aspect of the disclosed one-axis tracker is inter-panel connections of solar cells to increase power output due to inter-tracker shading at sunrise and sunset. This approach enables the solar panel to start at lower elevation angle or packed densely between trackers; either will effectively produce more power output for the entire tracker.

For those skilled in the arts may change various aspects of the disclosure. For example, the linear actuators can be attached to a fixed bracket welded on both ends of the center axis tubing. The attachment of L-beams 21 or T-beams 22 on center axis tubing can use various techniques other than those proposed. The method of attaching the L-beams 21 and T-beams 22 to bushing can use different U-bolts instead of pillow block clamp. Also, the attachment of linear actuator can be at different angle with different shape and curvature of the arm. Many variations of the wind lock are possible including using half circle tubing instead of flat beam. The equal spacing wind lock holes on the half circle tubing can be drilled on one side of tubing tapered to match wind lock rod. Even though various aspects of the disclosed one-axis tracker have been shown and described, modification may occur to those skilled in the art upon reading the specification. The present application includes such modifications and limited by the scope of the claims.

What is claimed is:

1. A one-axis solar tracker apparatus comprising:
  a rotating axis tubing fixed and secured horizontally atop a plurality of ground posts at predetermined spacing between said posts, wherein said rotating axis tubing is one piece or multiple pieces connected by tube couplings;
  a plurality of rotating bushings fittingly looped on said rotating axis tubing with a spacing between said rotating bushings matching a dimension of solar panels;

two parallel first beams at both ends of said rotating axis tubing with inner sides facing each other are mounted atop said rotating bushings with clamps secured under said first beams, wherein said ground posts are located inside and adjacent to said first beams with a first designed distance;

a plurality of second beams between said first beams, mounted similarly atop said rotating bushings with the clamps secured under said second beams, and the spacing between said second beams and first beams accommodate the solar panel dimension to be mounted, wherein said second beams and first beams are identical in length and depth matching said solar panel dimensions, and wherein said ground posts are adjacent to some of said second beams at a second designed distance;

two elongated third beams matched in length with said rotating axis tubing, attached on both ends of said first beams and second said beams; wherein said third beams can be sectional and attached in between said first beam and second said beams to make an elongated rectangular tracker frame; and wherein said tracker frame is mounted atop and rotates around said rotating axis tubing;

a plurality of right triangular plates, secured on four corners of all junctions between said first beams, said second beams with respect to said third beams to reinforce said rectangular frame structures throughout said tracker frame;

a plurality of rectangular solar panels mounted fittingly in the rectangular spacing between said first beams, said second beams and said elongated third beams with said solar panel frames secured on said first beams, said second beams and said elongated third beams;

a horizontal rod secured at one end on said ground post near a middle of said rotating axis tubing, and optionally secured on a vertical fixed arm at an other end; wherein one of said second beams is between said post and said vertical fixed arm; and wherein the top of said vertical fixed arm clamps on said rotating axis tubing; and wherein said horizontal rod serves as rotating axis for a linear actuator attached underneath;

two hanging rotating arms with top ends hinged on said horizontal rod, wherein bottom ends of said two rotating arms clamp on the body of said linear actuator, and wherein the jack head of said linear actuator is hinged under one side of said second beam;

a half circle beam for wind locking, attached under said first beams at both ends the of said tracker and optionally on said middle second beams adjacent to the ground posts; wherein said half circle beam is drilled with one or a plurality of wind locking holes; and wherein said half circle beam is rotating with said tracker while guided by two sets of tracking rollers fixed on said ground post; and a wind lock device, attached on said ground post atop said half circle beam and between said pairs of guiding rollers, wherein said wind lock device has a center activation rod with tapered head; and wherein said activation rod is driven up or down to unlock or lock on said half circle beam through said locking holes.

2. The one-axis solar tracker apparatus of claim 1 wherein said horizontal rotating axis tubing is tilted an angle toward equator direction for higher latitude installation.

3. The one-axis solar tracker apparatus of claim 1 wherein all tracker components and parts are made of rustproof steel metal and/or rustproof metal alloy materials.

4. The one-axis solar tracker apparatus of claim 1 wherein said two first beams and said second beams use identical reverse T-beams; and wherein said T-beams are made of bended sheet metal with center post of T bended U-shaped; and wherein the bottom of said T bended U-shaped is further utilized for securing said solar panels; and wherein an uniform pillow block clamp is used to secure said rotating bushings between said rotating axis tubing and said tracker T-beams.

5. The one-axis solar tracker apparatus of claim 1 wherein said linear actuator is used to rotate the tracker frame around said central tubing; wherein said linear actuator with its jack head hinged under said middle second beam at one side and with its body held by rotating arms hinged on said horizontal rod; and wherein said horizontal rod is fixed on said ground post at one end and optionally on said vertical fixed arm on the other end.

6. The one-axis solar tracker apparatus of claim 5 wherein said horizontal rod is attached at bottom ends of two parallel vertical fixed arms; and wherein the top ends of said parallel fixed arms clamping on said rotating axis tubing at two sides of said middle second beam; and wherein said two vertical fixed arms are connected and fixed by a horizontal bar in between.

7. The one-axis solar tracker apparatus of claim 1 wherein said linear actuator is clamped on at the bottom ends of two parallel rotating arms; and wherein said two parallel rotating arms are attached with an optional spacer tubing in between at the top end; and wherein said two parallel rotating arms and said spacer tubing are hinged on said fixed horizontal rod for the rotation of said linear actuator.

8. The one-axis solar tracker apparatus of claim 1 wherein two linear actuators jack heads are hinged symmetrically under opposite sides of two second beams; and wherein said two linear actuators works in unison, but with reverse extension in push or pull direction of jack heads to rotate said solar tracker from sunrise to sunset.

9. The one-axis solar tracker apparatus of claim 1 wherein said ground posts at both ends and some of said middle ground posts are designed to be adjacent to, but not directly under, said second beams for the purpose of wind lock of said tracker frame to said ground posts.

10. The one-axis solar tracker apparatus of claim 1 wherein said half circle beam for wind lock is replaced with a half circle tubing with one or more wind lock holes drilled at an inner side of said tubing.

11. The one-axis solar tracker apparatus of claim 1 wherein said half circle beam is drilled with a plurality of equal spacing holes for stepwise wind locking following step by step rotation of said solar tracker.

12. The one-axis solar tracker apparatus of claim 1 wherein said half circle beam is made of magnetic attractable steel material; and wherein said wind lock device is equipped with an electro-magnetic device capable of magnetizing a center rod by activation; and wherein said magnetized center rod is attracted to said half circle metal beam horizontally or vertically when activated to lock up said solar tracker at any position by magnetization force; and wherein said tracker can be stepwise wind locked following each step of tracker rotation.

13. The one-axis solar tracker apparatus of claim 1 wherein said half circle beam is replaced with a triangular beam drilled with locking hole or attached with a a horizontal tube hole at a center wedge; wherein a fix plate attached on said ground post under said triangle beam with a matching hole or wherein said adjacent post is drilled with a matching hole; and wherein a nail-shaped T-rod is inserted vertically or horizontally into said two aligned locking holes for wind lock when solar tracker is at flattened position.

14. The one-axis solar tracker apparatus of claim 13 wherein an electro-magnetic device is secured on said ground post under said triangular beam attached with a magnetic attractable center flat section; and wherein said fix plate is replaced with an electro-magnetic locking device horizontally or vertically; and wherein a magnetized center rod is attracted to said center flat section of said triangle metal beam when activated; and wherein said solar tracker is locked at a flattened position by magnetization force.

15. The one-axis solar tracker apparatus of claim 1 wherein said solar panels are connected in series row by row only; and wherein each row is interconnected to a corresponding row in adjacent said solar panels; wherein all corresponding rows of said solar panels along rotating axis direction are connected for a series output for the entire solar tracker module.

16. A one-axis solar tracker system comprising:
   an rotating axis tubing fixed and secured horizontally atop a plurality of ground posts at predetermined spacing between said posts; wherein said rotating axis tubing is one piece or a plurality of pieces connected by tube couplings;
   a plurality of rotating bushings, fittingly looped on said rotating axis tubing with a spacing between said bushings matching a dimension of solar panels;
   two parallel first beams at both ends of said rotating axis tubing with inner sides facing each other are mounted atop said rotating bushings with clamps secured under said first beams; and wherein said ground posts are located inside and adjacent to said first beams with a first designed distance;
   a plurality of second beams between said first beams are mounted similarly atop said rotating bushings with clamps secured under said second beams; and the spacing between said second beams and said first beams accommodate the solar panel dimension to be mounted; wherein said second beams and said first beams are identical in length and depth matching said solar panel dimensions; and wherein said ground posts are adjacent to some of said second beams at a second designed distance;
   two elongated third beams matched in length with said rotating axis tubing, attached on both ends of said first beams and said second beams; or wherein said third beams can be sectional and attached in between said first beam and said second beams to make an elongated rectangular tracker frame; and wherein said tracker frame is mounted atop and rotates around said rotating axis tubing;
   a plurality of right triangular plates secured on four corners of all junctions between said first beams, second beams with respect to said third beams to reinforce said rectangular frame structures throughout said tracker frame;
   a plurality of rectangular solar panels mounted fittingly in the rectangular spacing between said second beams and said first beams with solar panel frames secured on said first beams, second beams and said elongated third beams;
   a horizontal rod secured at one end on said ground post near a middle of said rotating axis tubing, and optionally secured on a vertical fixed arms at an other end; wherein one of said second beams is between said ground post and said vertical fixed arm; and wherein a top of vertical fixed arm clamps on said rotating axis tubing; and wherein said horizontal rod serves as rotating axis for a linear actuator attached underneath;
   two hanging rotating arms with top ends hinged on said horizontal rod; wherein the bottom ends of said two rotating arms clamp on the body of said linear actuator; and wherein the jack head of said linear actuator is hinged under one side of said second beam;
   a half circle beam for wind locking, attached under said first beams at both ends of said tracker and optionally under middle beams adjacent to said ground posts; wherein said half circle beam is drilled with one or a plurality of wind locking holes; and wherein said half circle beam is rotating with said tracker while guided by two sets of tracking rollers fixed on said ground post; and
   a wind lock device attached on said ground post atop said half circle beam and between said pairs of guiding rollers; wherein said wind lock device has a center activation rod with tapered head; and wherein said activation rod is driven up or down to unlock or lock on said half circle beam through said locking holes.

17. The one-axis solar tracker system of claim 16 wherein said horizontal rotating axis tubing is tilted to an angle toward an equator direction for higher latitude installation.

18. The one-axis solar tracker system of claim 16 wherein the rotating axis tubing is fixed a to a plurality of said ground posts; wherein said tracker frame is rotating around said rotating axis tubing with cylindrical bushings in between for rotation bearing.

19. The one-axis solar tracker system of claim 16 wherein said two first beams at both ends are replaced by said second beams, and wherein a uniform pillow block clamp is used to secure said rotating bushings to said second beams.

20. The one-axis solar tracker system of claim 16 wherein said linear actuator is used to rotate said tracker frame around said central tubing; wherein said linear actuator with its jack head hinged under said second beam at one side and with its body held by rotating arms hinged on said horizontal rod; and wherein said horizontal rod is fixed at one end on said ground post and optionally on said fixed vertical arm an other end which clamps on said center tubing.

21. The one-axis solar tracker system of claim 20 wherein said horizontal rod is attached a at bottom ends of two parallel vertical fixed arms; and wherein top ends of said parallel fixed arms clamping on said rotating axis tubing at two sides of a middle second beam; and wherein said two vertical fixed arms are connected and fixed by a horizontal bar in between.

22. The one-axis solar tracker system of claim 16 wherein said linear actuator is clamped on at the bottom ends of two parallel rotating arms; and wherein said two parallel rotating arms are attached with an optional spacer tubing in between at top ends; and wherein said two parallel rotating arms and said spacer tubing is hinged on said fixed horizontal rod for the rotation of said linear actuator.

23. The one-axis solar tracker system of claim 16 wherein two linear actuators jack heads are attached symmetrically on opposite sides of two second beams; and wherein said two linear actuators work in unison, but with reverse extension of jack heads in push or pull direction to rotate said solar trackers from sunrise to sunset.

24. The one-axis solar tracker system of claim 16 wherein said ground posts at both ends and some of said middle ground posts are designed to be adjacent to, but not directly under, said second beams for the purpose of wind locking of said tracker frame to said ground posts.

25. The one-axis solar tracker system of claim 16 wherein said half circle beam is replaced with a half circle tubing with one or more wind lock holes drilled at inner side of said tubing.

26. The one-axis solar tracker system of claim 16 wherein said half circle beam is drilled with a plurality of equal spacing holes for stepwise wind locking following step by step rotation of said solar tracker.

27. The one-axis solar tracker system of claim 26 wherein wind speed is detected by a central controller or manned operator; and wherein stepwise wind locking following each step of linear actuator activation is exercised whenever a predetermined wind speed threshold is exceeded.

28. The one-axis solar tracker system of claim 16 wherein said half circle beam is made of magnetic attractable steel metal; and wherein said center rod by electro-magnetization attracts to said half circle metal beam horizontally or vertically, which locks up said solar tracker in any position.

29. The one-axis solar tracker system of claim 28 wherein said electro-magnetic wind lock mechanism is used for stepwise wind locking of said tracker frame following each step of said linear actuator activation.

30. The one-axis solar tracker system of claim 29 wherein wind speed is detected by a central controller or manned operator; and wherein stepwise wind locking following each step of linear actuator activation is exercised whenever a predetermined wind speed threshold is exceeded.

31. The one-axis solar tracker system of claim 16 wherein said half circle beam is replaced with a triangular beam with a locking hole or horizontal tube hole at a center wedge; and wherein making a wind lock hole at bottom plate or at said a adjacent ground post; and wherein said tracker frame is wind locked by a manual T-rod inserted vertically or horizontally.

32. The one-axis solar tracker system of claim 31 wherein said triangular beam is attached with a magnetic attractable center flat piece; and wherein said tracker frame is wind locked by an attraction of electro-magnetic center rod horizontally or vertically to a center flat section at activation of said electro-magnetic device.

33. The one-axis solar tracker system of claim 16 wherein said solar panel are connected in series row by row only; and wherein each row is interconnected to a corresponding row in adjacent solar panels; wherein all of said corresponding rows of solar panels in rotating axis direction are connected for a series output for the solar tracker module.

\* \* \* \* \*